Oct. 2, 1923.  
G. MAROTTA  
FRICTION CLUTCH  
Filed Jan. 25, 1921
1,469,564
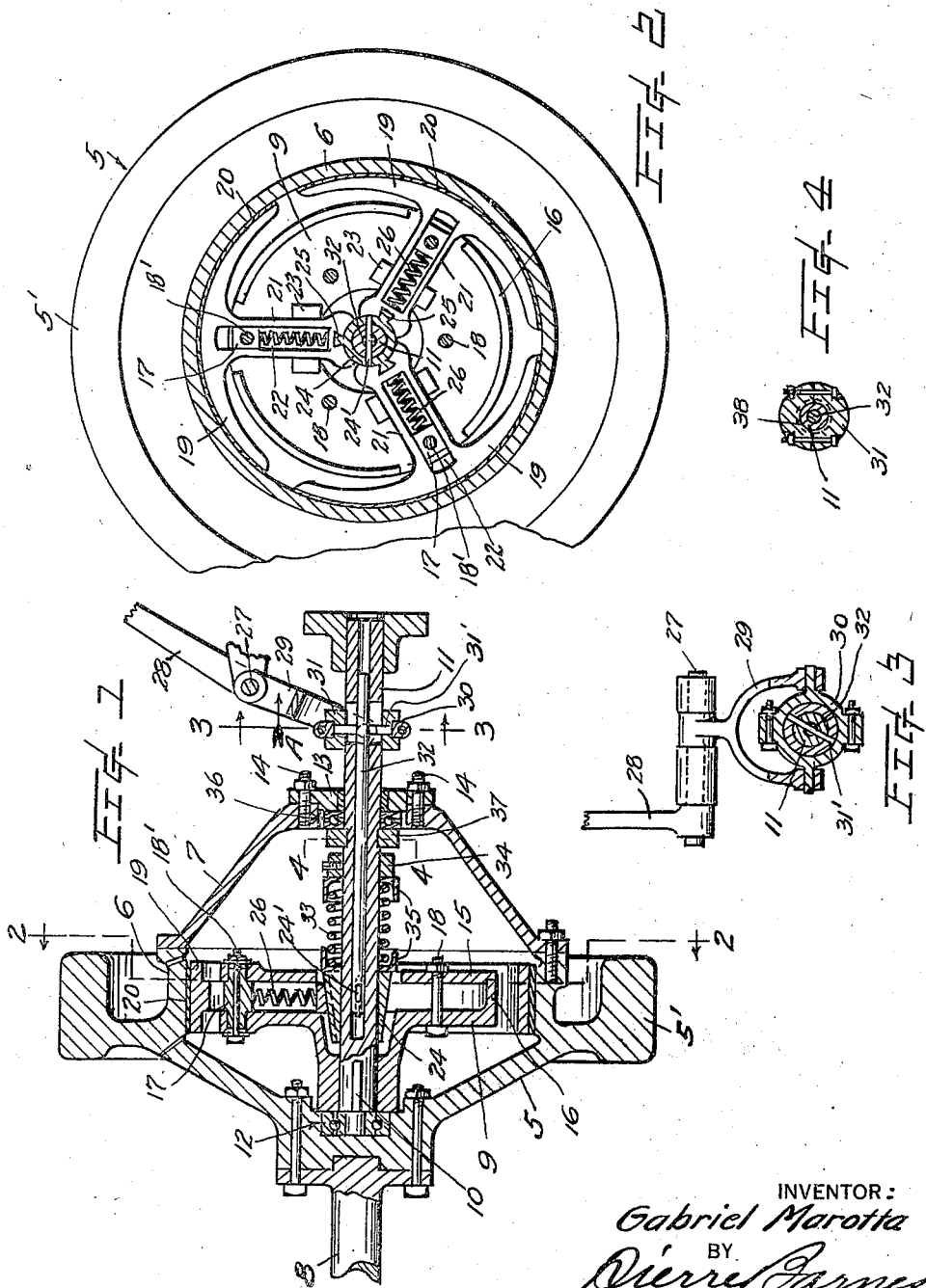
INVENTOR:  
*Gabriel Marotta*  
BY  
*Pierre Barnes*  
ATTORNEY Patented Oct. 2, 1923.

1,469,564

UNITED STATES PATENT OFFICE.

GABRIEL MAROTTA, OF SEATTLE, WASHINGTON, ASSIGNOR OF ONE-HALF TO JOHN MAROTTA, OF SEATTLE, WASHINGTON.

FRICTION CLUTCH.

Application filed January 25, 1921. Serial No. 439,747.

*To all whom it may concern:*

Be it known that I, GABRIEL MAROTTA, a citizen of the United States, residing at Seattle, in the county of King and State of Washington, have invented certain new and useful Improvements in Friction Clutches, of which the following is a specification.

This invention relates to friction clutches, and its object is to provide simple and inexpensively constructed devices of this character whereby a driving shaft may be releasably connected to a driven shaft for effectually rotating the latter in unison with the driving shaft.

With these ends in view, the invention consists in the novel construction, adaptation and combination of parts as hereinafter described and claimed.

In the accompanying drawings, Figure 1 is a longitudinal vertical section of clutch mechanism embodying my invention. Fig. 2 is a transverse sectional view on broken lines 2—2 of Fig. 1. Figs 3 and 4 are detail sectional views through 3—3 and 4—4 of Fig. 1.

The driving member of the present invention consists of a pulley or wheel 5 having an annular flange 6 concentric to the wheel axis and a shell 7 which is detachably secured to the flange 6 as by bolts. Said wheel is desirably provided with a heavy rim $5^1$ to serve as a fly-wheel and is secured to a driving shaft 8 to always rotate therewith.

The driven train of the clutch comprises a wheel 9 secured by a key 10 to the driven shaft 11 which is arranged in axial alignment with the driving shaft 8.

An end of the shaft 11 is journaled in the hub of the fly-wheel 5 and desirably through the medium of anti-friction ball bearings 12.

The shaft 11 is also journaled in a plate 13 which is removably secured by bolts 14 to the shell 7.

The wheel 9 of the driven train is chambered and provided with a detachable face plate 15 which is secured against flanges 16 and spacing blocks 17 by bolts 18 and $18^1$.

The clutching devices proper comprise expanding mechanism in the nature of arcuate shoe elements 19 which are engageable with the inner periphery of the annular flange 6 of the driving wheel, either directly or, as shown, through the medium of suitable lining material 20 which is attached to the respective shoes.

Said shoes are each formed integral with a stem 21 arranged radially of the clutch axis and having a slot 22 which serves as a guide for the said stems when the respective blocks 17 are positioned therein.

Adjacent to its inner end each shoe stem extends through a way intermediate guide elements 23 of the wheel 9.

The inner end of each shoe stem is formed to fit against the peripheral surface of a cone 24 which is mounted upon the driven shaft 11. This cone is, moreover, provided with longitudinally arranged ribs 25 (Fig. 2) of dovetail shape in transverse section which engage within correspondingly shaped grooves provided within the respective shoe stems.

When the cone 24 is moved in one axial direction the conical surface of the cone coacting with the juxtaposed ends of the stems causes the shoes to be thrust radially outward into engaged positions, and when the cone is moved in the opposite axial direction the cone ribs 25 act to positively disengage the shoes from the driving member of the clutch.

Springs 26 acting between the blocks 17 and the inner ends of the respective stem slots serve to take up wear and facilitate the disengaging of the shoes.

The longitudinal movements of the cone are obtained by any suitable means such as a lever fulcrumed at 27, with an operating arm 28 and a forked arm 29 which is connected as shown in Fig. 3 to a ring 30 seated in a circumferential groove of a shiftable collar 31 which is mounted upon the shaft 11.

The collar 31 is connected with the cone 24 by means of an operating rod 32 shiftable endwise in an axial bore of the driven shaft. The rod 32 is secured to both the cone 24 and shiftable collar 31 by diametrically arranged keys $24^1$ and $31^1$ movable longitudinally of the shaft in slots provided in the latter.

The cone 24 is, however, normally held in operating relations with the clutch shoe devices by means of a helical spring 33 located between the cone and a set collar 34 of shaft 11.

Wearing collars 35 are desirably interposed between the ends of spring 33 and the cone and set collar, respectively.

36 represents an anti-friction thrust bearing positioned between the plate 13 and a collar 37 which is rigidly secured to shaft 11.

To obviate any accidental displacement of the collar 37, the same is advantageously made of two separable parts, Fig. 4, and seats in a circumferential shaft recess 38.

The operation is as follows:

Assuming the various parts of the clutch occupy the relative positions in which they are illustrated in Fig. 1 the clutch is engaged to transmit power from the driving shaft 8 to the driven shaft 11. The train or system of mechanism through which the power is transmitted from said driving shaft 8 to the driven shaft 11 is composed of the flange 6 formed with the wheel 5 and operating with the driving shaft, and the shoe devices 19—21 through the medium of the wheel 9 and operating with the driven shaft.

The clutch expanding mechanism comprising said shoe devices is engaged and disengaged through the instrumentality of the cone 24 which is operated by means of lever 28—29 acting through the medium of the operating rod 32.

Normally the spring 33 maintains the cone 24 in operative position with respect to the shoe devices and to uncouple the clutch, the operator swings the lever arm 29 in the direction of arow A, Fig. 1, to correspondingly draw the rod 32 and the cone 24 which is connected thereto into contracting relations with respect to the shoe devices.

While I have illustrated the apparatus as embodying three shoe devices it is to be understood that the number may be more or less according to the size and duty of the clutch.

What I claim, is,—

In combination with a driving shaft, a fly wheel attached thereto, an annual flange formed integrally with said fly wheel, and a shell detachably secured to the said flange, of a driven shaft journaled in said wheel and shell, a wheel securely keyed to the said driven shaft, a broken flange formed integrally with said wheel at its extreme outer edge, a detachable face plate secured against said broken annular flange, a series of spacing blocks securely held between said wheel and face plate, an axial bore through substantially the full length of the said driven shaft, a rod slidably mounted in the bore of said driven shaft, a cone slidably mounted on said driven shaft and keyed to said rod, a series of dove-tail-shaped ribs formed integrally with said cone and extending longitudinally thereon, a series of arcuate shoes positioned for frictionally engaging the flange formed with said fly wheel slotted stems formed integrally with said arcuate shoes and mounted to slide on said spacing blocks, the inner ends of the shoe stems being operatively connected with the dove-tail-shaped ribs formed on the said cone member and means mounted on the said driven shaft and keyed to said rod for sliding said rod and cone lengthwise of said driven shaft to move said arcuate shoes into and out of frictional engagement with the flange on said fly wheel, for operatively connecting the driving shaft with said driven shaft.

Signed at Seattle, Washington, this 18th day of January, 1921.

GABRIEL MAROTTA.

Witnesses:
PIERRE BARNES,
MARGARET G. SUPPLE.